United States Patent [19]
Firth

[11] Patent Number: 5,738,713
[45] Date of Patent: Apr. 14, 1998

[54] APPARATUS FOR BIOLOGICAL CONTROL OF NOXIOUS GAS FROM SWINE WASTE

[76] Inventor: Jay A. Firth, 7948 NE. Berwick Dr., Ankeny, Iowa 50021

[21] Appl. No.: 514,446

[22] Filed: Aug. 10, 1995

[51] Int. Cl.⁶ .................................................. B01D 53/02
[52] U.S. Cl. .............................. 96/131; 96/133; 96/152
[58] Field of Search ............................ 210/916; 96/108, 96/121–124, 127, 131–133, 135, 140, 141, 142, 152–154

[56] References Cited

U.S. PATENT DOCUMENTS

| | | |
|---|---|---|
| 1,701,825 | 2/1929 | Seil. |
| 2,200,581 | 5/1940 | Prüss et al. ............................... 195/2 |
| 2,793,096 | 5/1957 | Pomeroy ................................... 23/2 |
| 3,216,905 | 11/1965 | Baptist ..................................... 195/2 |
| 3,966,450 | 6/1976 | O'Neill et al. ......................... 210/916 |
| 4,160,656 | 7/1979 | Junkermann ........................... 210/916 |
| 4,421,534 | 12/1983 | Walker .................................... 55/73 |
| 4,435,194 | 3/1984 | Picard et al. ............................ 95/19 |
| 4,444,575 | 4/1984 | Miller et al. ............................ 96/132 |
| 4,544,381 | 10/1985 | Schmidt ................................... 55/89 |
| 4,609,537 | 9/1986 | Tolpin et al. ............................ 95/214 |
| 4,622,210 | 11/1986 | Hirschberg et al. ..................... 96/135 |
| 4,662,900 | 5/1987 | Ottengraf ................................ 55/90 |
| 4,723,968 | 2/1988 | Schippert ................................ 55/80 |
| 4,806,148 | 2/1989 | Ottengraf ................................ 55/223 |
| 4,999,302 | 3/1991 | Kahler et al. ........................... 55/92 |
| 5,064,763 | 11/1991 | Bentz .................................... 435/266 |
| 5,082,475 | 1/1992 | Bentz ...................................... 55/68 |
| 5,618,730 | 4/1997 | Eder et al. .............................. 96/108 |

OTHER PUBLICATIONS

Hodge and Devinny, Biofilter Treatment of Ethanol Vapors, Aug. 1994, pp. 167–173, Environmental Progress (vol. 13, No. 3).

*Primary Examiner*—Thomas G. Wyse
*Attorney, Agent, or Firm*—Zarley, McKee, Thomte, Voorhees, & Sease

[57] ABSTRACT

This invention concerns the application of a biological air filter to neutralize noxious gases produced and emanating from swine production facilities. The treatment is accomplished by passing air through modular units; the modular units are inoculated with organisms selected for ability to neutralize noxious gases.

17 Claims, 1 Drawing Sheet

APPARATUS FOR BIOLOGICAL CONTROL OF NOXIOUS GAS FROM SWINE WASTE

BACKGROUND OF THE INVENTION (1.) Field of Invention

The present invention relates to a means and a method for the treatment of air discharged from swine production facilities. For purposes of this application, swine production facilities are swine confinement rearing and fattening houses, waste lagoons, and other structures in which swine excreta is collected or stored. The present invention is a means and process to treat noxious gases generated by swine excreta. Commonly these gases accumulate in the air space between an excreta pool (pit) and the floor above upon which swine are raised. It is believed that this invention will prove useful in the treatment of other gaseous streams.

(2.) Description of Prior Art

Heretofore the prior art has been to directly discharge these noxious gases into the environment. This discharge is generally accomplished by the use of vents and fans that draw the gases from the top of the excreta pool. Such practice commonly results in air pollution.

The present invention could be described as a form of air scrubber. However, the form, construction, components and ultimate use of the present invention distinguishes the present invention from prior devices and processes.

SUMMARY OF INVENTION

The present invention is a means and method:
1. To neutralize, oxidize, consume and digest odorous gases and compounds with specifically enhanced bacterial cultures, and
2. To utilize bacterial and biological means in cost effective systems for each application, and
3. To create a process environment where the appropriate organisms can rapidly and efficiently deodorize gaseous effluent, and
4. To provide flexibility of size, location, design and application through modular containment or multiple modules.

DETAILED DESCRIPTION OF PREFERRED EMBODIMENT

Figure 1:
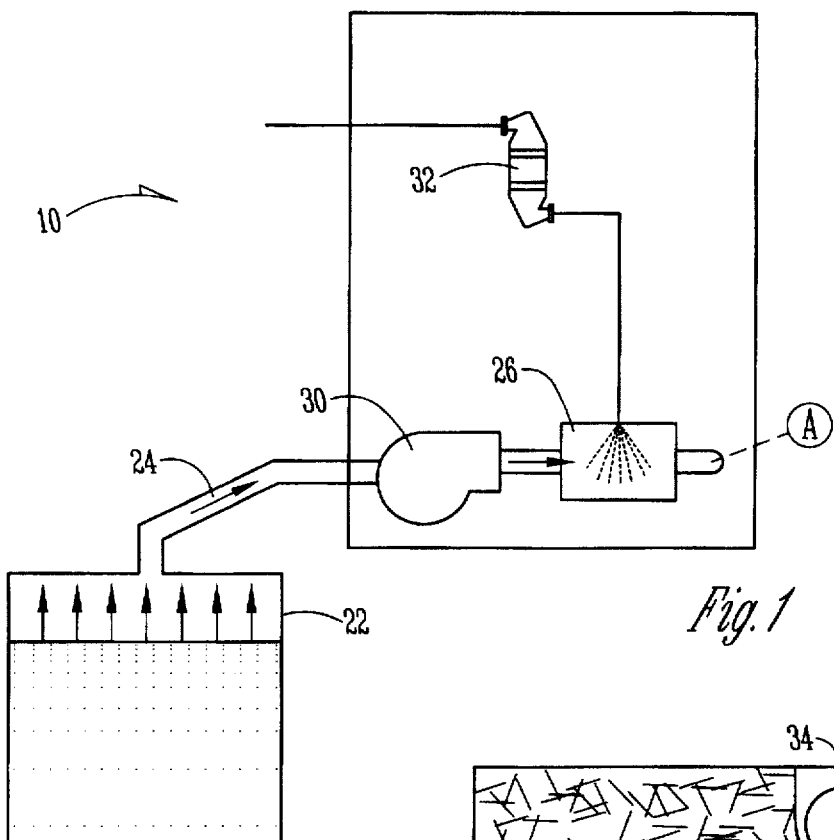
FIG. 1 is a diagramatic and elevational view of the present invention.
Figure 2:
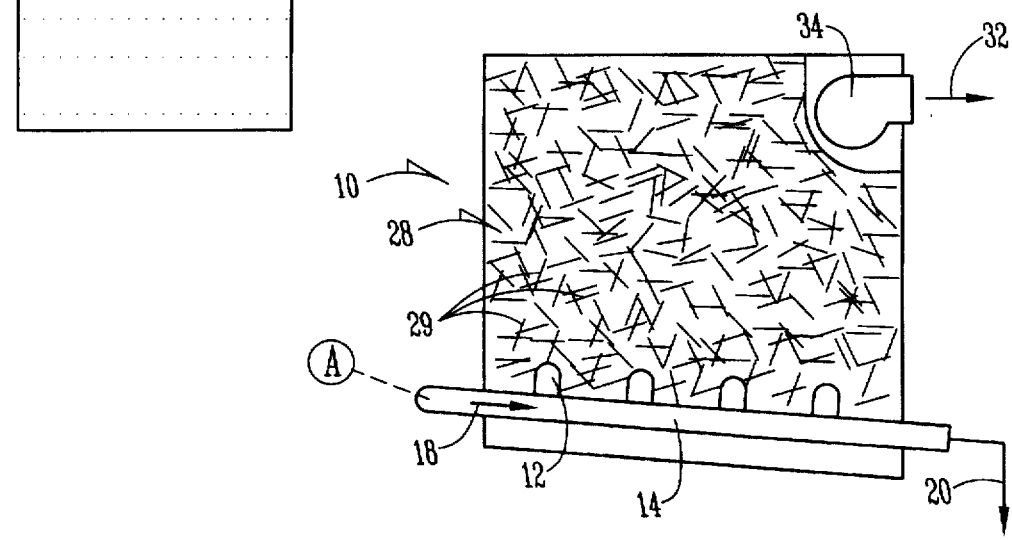
FIG. 2 is a diagramatic sectional view of the present invention.
Figure 3:
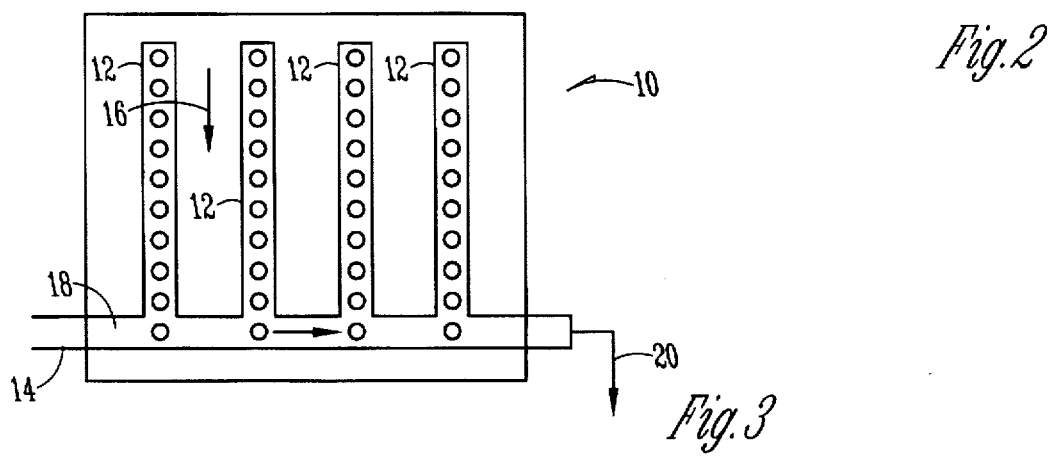
FIG. 3 is a partial plan view of the present invention.

The basic unit 10 is shown in FIG. 1. The figures are not drawn to scale. A single module 10 may be 4 feet by 8 feet by 6 feet and contain four 4-inch distribution ducts 12 as shown in FIG. 3. The side distribution ducts 12 slope back to a distribution pipe 14 as shown by arrow 16 in FIG. 3. The distribution pipe 14 slopes 1% to a condensate collector as shown by arrow 18 in FIGS. 2 and 3. At one end of the distribution pipe 14 is a condensate return to pit shown by arrow 20 in FIGS. 2 and 3. This module 10 should handle the gaseous effluent from the waste produced by 750 fattening pigs when collected from pits or lagoons such as waste pit 22 (FIG. 1). Multiple or larger modules are used for larger numbers.

The preferred installation directs all gases from the excreta pool through the module 10 where they are digested by selected organisms. (i.e., bacteria adapted to utilize large amounts of ammonia, hydrogen sulfide, phenols, mercaptans, fatty acids, etc.)

Incoming waste air (shown by arrow 24) and gases are preferably heated to 35 to 40 degrees centigrade and then humidified by humidifier 26 to 90 to 100% and forced into the filter bed 28 by blower 30 (150–200 mbar). The humidity of the air 24 entering the bed 28 should be 95%–100%. The humidifier outlet temperature is preferably 35°–40° centigrade. FIG. 1 shows a fresh water supply and filtration 32 for the humidifier. Lower temperatures and humidity work with slightly less efficiency.

Filter bed material consists of wood sticks or other cellulose material of varying size to prevent compaction and channeling of the gases. The filter bed 28 shown in FIG. 2 is 1.5–2 meters deep filled with wood sticks 29, 1×4, 1×6, 2×4, etc. Flow rates (of outgoing air shown by arrow 32) should be approximately 120 cubic meters per square meter of surface area of the filter. The flow may be assisted by an exhaust fan unit 30 at the top of the filter bed 28 (FIG. 2). Condensate from the filter bed 28 can be returned to the humidifier 26 or the pit source of the gas.

Bacteria which utilize ammonia, hydrogen sulfide, phenols, mercaptans, volatile fatty acids, etc., are isolated from the filter bed 28 and then stressed with increasing amounts of these gases to identify and select organisms capable of using these gases at faster rates and higher concentrations. The filter bed 28 is then reinoculated with the selected organisms. Cultures of selected organisms are maintained for reinoculation in the event of filter bed 28 dysfunction due to power failure or disruption of gas or water supply.

A model four feet wide, eight feet long and six feet deep as shown in FIG. 1 after operating only three weeks reduced ammonia emissions fivefold and reduced hydrogen sulfide by 50%. Further reductions are expected with selected organisms. A gram negative bacillus is predominant in the exhaust air while a gram negative, coagulase negative cocci is predominant in the condensate.

This patent application encompasses these modifications to the herein described basic unit:
1. Portable small units can be attached to existing wall fans.
2. Multiple pit fans can be connected to one or more central units.
3. Lagoons may be contained with a floating or rigid cover and the gases directed to a unit.
4. Wall and pit ventilation may be combined to contain all of the objectionable odors.

The present invention includes:

A biofiltration method and process for reducing the odor of gases arising from excreta pits and lagoons at swine confinement units.

A process for collecting, heating, humidifying and biologically degrading odorous gases arising from swine confinement units.

The process described above herein having adaptability to process other sources of biodegradable gases.

A procedure for the identification and selection of organisms that demonstrates enhanced capability for neutralizing noxious gases in exhaust air.

The use of cellulose materials such as wood, bark, corn stalks, hay, straw, etc., as nutrient media for gas decomposing bacteria.

Easy, economical adaptation of the process to the multiple configurations of swine confinement units.

Measurable reductions in ammonia, hydrogen sulfide, phenols, mercaptans, volatile fatty acids and other noxious components.

I claim:

1. An apparatus for filtering gasses arising from livestock production facilities comprising:
   a filter bed;
   a conduit in communication with the filter bed and with a source of gasses arising from a livestock production facility;
   a blower for drawing the gasses into the filter bed;
   a quantity of cellulose material disposed within the filter bed, the cellulose material being capable of providing nutrient media for gas decomposing bacteria; and
   a plurality of distribution ducts having a plurality of openings formed along their lengths, the ducts being disposed within the filter bed below a substantial portion of the cellulose material, the distribution ducts being in communication with the blower for injecting the gasses into the cellulose material via the openings.

2. The apparatus of claim 1 further comprising an exit formed in the filter bed for allowing treated gasses to exit the filter bed.

3. The apparatus of claim 2 wherein the exit is formed by an exhaust fan disposed proximate the top of the filter bed for causing treated gasses to exit the filter bed.

4. The apparatus of claim 3 wherein the exhaust fan is controlled to provide a flow rate of approximately 120 cubic meters per square meter of surface area of the filter bed.

5. The apparatus of claim 2 further comprising a humidifier in communication with the conduit for humidifying the gasses before the gasses are drawn into the filter bed.

6. The apparatus of claim 5 wherein the humidifier is connected to a source of water and a filtration system for supplying filtered water to the humidifier.

7. The apparatus of claim 5 wherein the gasses are humidified by the humidifier to a humidity ranging from 95%–100%.

8. The apparatus of claim 5 wherein the gasses are heated before the gasses are drawn into the filter bed.

9. The apparatus of claim 8 wherein the gasses are heated to a temperature ranging from 35 to 40 degrees Centigrade.

10. The apparatus of claim 1 further comprising a distribution pipe in communication with the blower at a first end of the distribution pipe and with the plurality of distribution ducts along the length of the distribution pipe, wherein the gasses are drawn in to the distribution ducts via the distribution pipe.

11. The apparatus of claim 10 wherein the distribution pipe is disposed parallel and proximate one side of the filter bed with the distribution ducts extending across the filter bed from the distribution pipe.

12. The apparatus of claim 11 wherein the distribution ducts are each sloped toward the distribution pipe.

13. The apparatus of claim 10 further comprising a return path in communication with the source of gasses and with a second end of the distribution pipe for returning condensation from the distribution pipe and distribution ducts to the source of gasses.

14. The apparatus of claim 13 wherein the distribution pipe is sloped downward toward the return path.

15. The apparatus of claim 14 wherein the slope of the distribution pipe approximately 1 percent.

16. The apparatus of claim 1 wherein the cellulose material is comprised of at least one of: wood material, bark, corn stalks, hay, and straw.

17. An apparatus for filtering gasses from a livestock production facility comprising a plurality of modular units, wherein each of said modular units comprises:
    a filter bed;
    a conduit in communication with the filter bed and with a source of gasses arising from the livestock production facility;
    a blower for drawing the gasses into the filter bed;
    a quantity of cellulose material disposed within the filter bed, the cellulose material being capable of providing nutrient media for gas decomposing bacteria; and
    a distribution pipe having first and second ends, the first end being in communication with blower for receiving gasses from the blower, the second end being in communication with a return path to the source of gasses, wherein the distribution pipe slopes downward from the first end to the second end; and
    a plurality of distribution ducts having first and second ends, the distribution ducts having a plurality of openings formed along their lengths, the ducts being disposed within the filter bed below a substantial portion of the cellulose material, the distribution ducts being in communication with the distribution pipe at their first ends for receiving gasses and injecting the gasses into the cellulose material via the openings.

* * * * *